No. 728,266. Patented May 19, 1903.

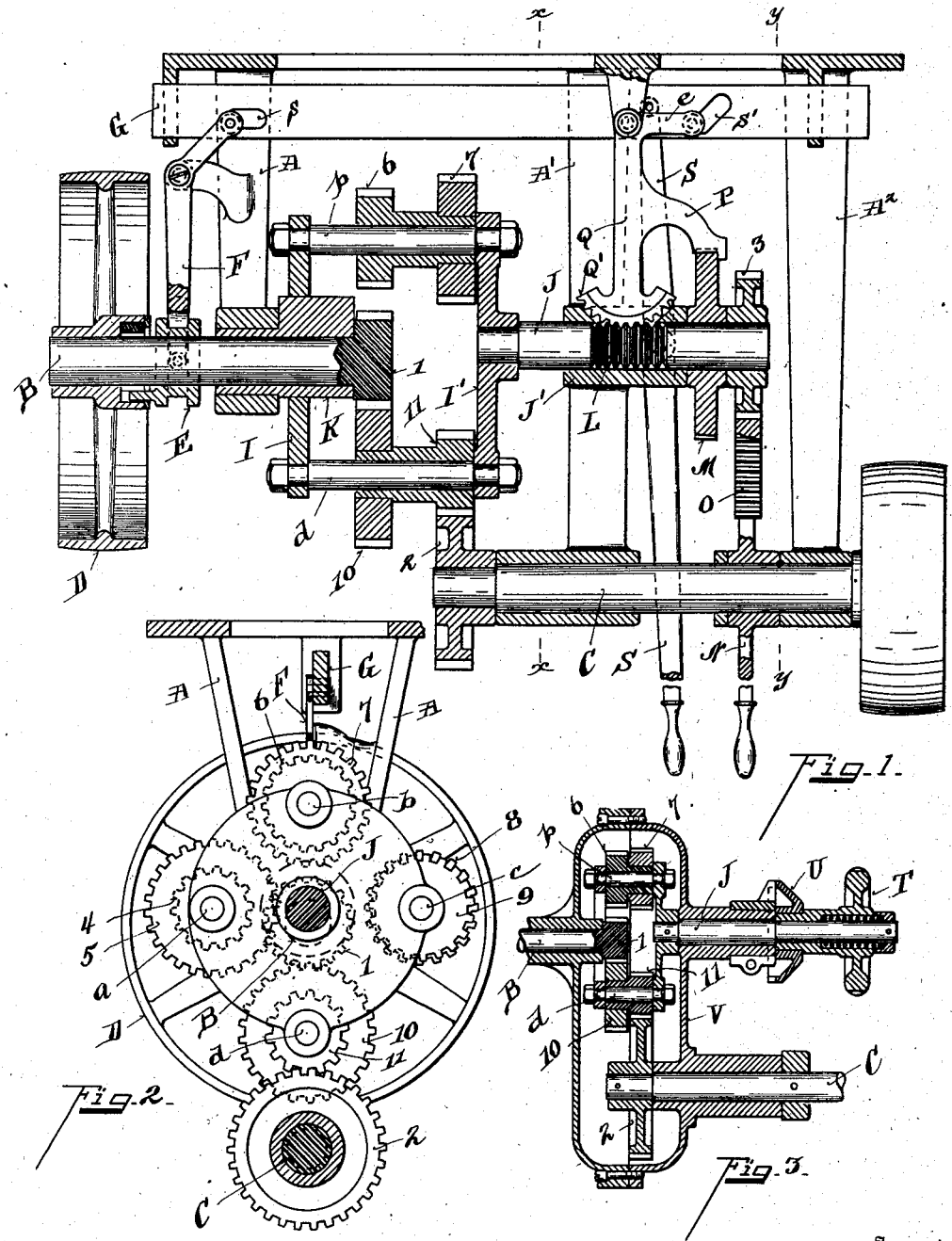

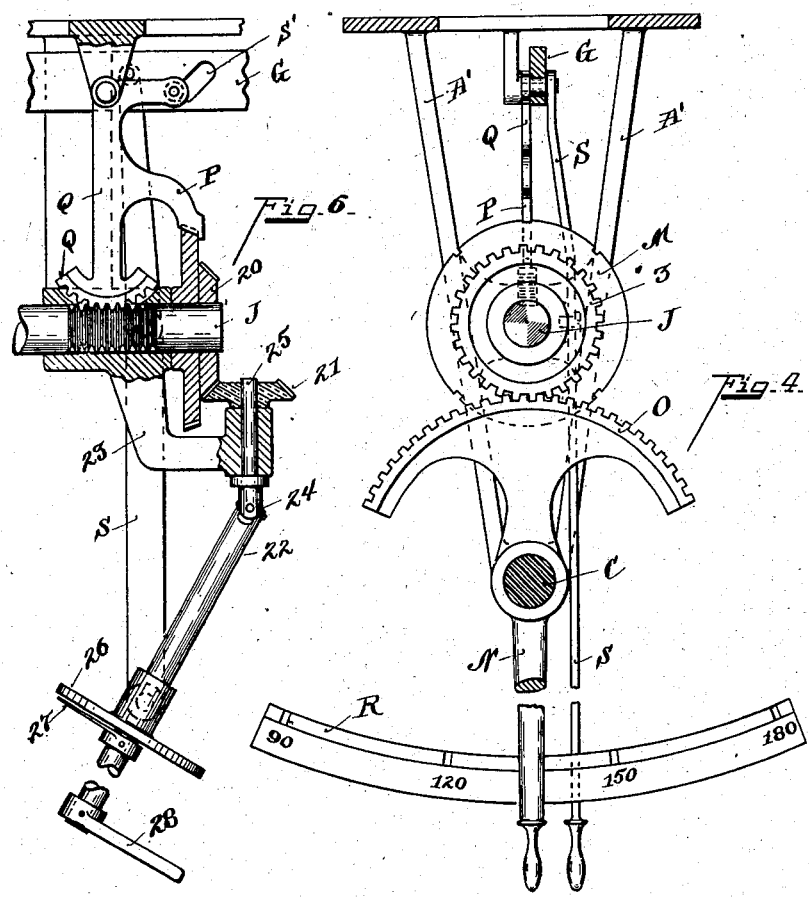

UNITED STATES PATENT OFFICE.

ANTON MILL, OF CINCINNATI, OHIO.

VARIABLE-SPEED MECHANISM.

SPECIFICATION forming part of Letters Patent No. 728,266, dated May 19, 1903.

Application filed July 10, 1902. Serial No. 115,015. (No model.)

*To all whom it may concern:*

Be it known that I, ANTON MILL, a citizen of the United States, residing at Cincinnati, in the county of Hamilton and State of Ohio, have invented certain new and useful Improvements in Variable-Speed Mechanism, of which the following is a specification.

My invention relates to a variable-speed device, which for convenience of illustration is shown as applied to a counter-shaft, but which in its principle of construction is adaptable to any machine organization in which a variety of feeds or speeds is desired.

The object of my invention is to provide a simple mechanism which in a small compass and with the smallest possible number of gear-wheels will give an obtainable range of speeds equal to any machine-tool requirement.

Another object of my invention is to provide superior shifting devices for actuating the several parts in their respective movements, whereby the changes may be quickly and conveniently made.

Another object of my invention is to so connect these shifting devices with the prime moving wheel that the changes can be quickly made with the power removed.

Other features and details of my invention will be more fully set forth in the description of the accompanying drawings, making a part of this specification, in which—

Figure 1 is a central vertical section of my device. Fig. 2 is a section on line X X, Fig. 1. Fig. 3 is a central section of a modification. Fig. 4 is a section on line $y$ $y$, Fig. 1. Fig. 5 is a plan view of the shifting bar. Fig. 6 is a modified view of the shifting mechanism for shifting bar.

A A' A² represent the journal-brackets suspended from the ceiling. B represents the driving-shaft, and C the driven shaft, journaled in suitable bearings in said brackets. D represents the driving pulley-wheel loose on the driving-shaft. E represents a clutch on the driving-shaft for fixing said driving-wheel to said shaft, and vice versa. F repsents the clutch-shifting lever pivoted to bracket A, one end of which engages into a slot $s$ of the sliding bar G, slidably arranged or suspended from said brackets parallel to the shafts. It will be noted that said shafts have their inner ends opposing, between which ends the variable-speed gears are located. As shown, the driving-shaft is used as the partial journal for said variable-speed gear-wheel support. This arrangement might be reversed. The driven shaft might continue through the supporting structure also. In the form shown, however, one of the shafts should preferably terminate the supporting structure, so as to present an abutting end to the variable-speed gear-wheel support. 1 represents the driving gear-wheel fixed on the end of the driving-shaft, and 2 represents the driven gear-wheel fixed on the end of the driven shaft. These gear-wheels, it will be noted, are revoluble in parallel planes, and the primary scheme of the invention is to bring a graduated series of compound intermediate gear-wheels selectively into mesh with said driving and driven gear-wheels, respectively. Thus the speed is always obtained from the same driving and the same driven gear-wheels, but compounded by the compound intermediates. It is necessary that the support for said intermediates be revoluble in the parallel planes of said driving and driven gear-wheels, respectively, and be capable of being presented thereto in the different horizontal and vertical planes, respectively, of said driving and driven gear-wheels. This rotary intermediate support in the preferred form of construction consists of the two opposing disks I I', disk I, eccentrically journaled on sleeve K, on shaft B, and disk I', having a stub-shaft J, journaled in elongated bearing J' on bracket A', the said journal J' being opposite to and concentric with the journal of said disk I, whereby these disks rotate as a unit in the parallel vertical planes of revolution of the driving and driven gear-wheels. The stub-shaft J is provided with a rack L, accessible by means of a longitudinal slot in the journal-bearing J'. Stub-shaft J also has a notched disk M and a gear-wheel 3, fixed thereto for purposes to be hereinafter described. Between these supporting-disks I I' are supported the studs $a\ b\ c\ d$, on which the intermediate compound gear-wheels 4, 5, 6, 7, 8, 9, and 10 11 are journaled, respectively. Four changes are shown, though the range could be increased or reduced, as desired.

By "compound intermediate gear-wheels" is meant two gear-wheels of different diameter, which revolve as a unit, and one of which engages the driving and the other the driven gear-wheel simultaneously, this being a well-known means of compounding. My invention contemplates taking a graded series of such intermediates and devising a support and movability therefor and actuating means therefor by which any selected one of the compounds may be brought into train with the driving and driven gear-wheels.

In my preferred form of invention herein illustrated the eccentricity of the gear-support relative to the shaft B and the eccentric disposition of the studs $a$ $b$, &c., relative to the center of the disks I I' are such that when the support is rotated the intermediates are successively thrown into and out of mesh with the driving and driven gear-wheels. As shown, then, the studs $a$ $b$, &c., have an orbit of revolution around shaft B and between shafts B and C, at a given point of which each of said intermediates is successively thrown into mesh with gears 1 2 and at every other point in which revolution said intermediates are out of mesh, and hence stationary. The members 4, 6, 8, and 10 of said intermediate compounds are each revoluble in the plane of revolution of driving gear-wheel 1, and the other members of said compounds, respectively, 5, 7, 9, and 11, are each revoluble in the plane of revolution of driven gear-wheel 2. The stud-shaft J is movable longitudinally in its bearings, and the disk I is slidable longitudinally on its journal, so that the support J may be bodily slid in directions transverse to its plane of rotation. By this movement the support can be slid to a position at the right of that shown in Fig. 1, in which position the support may be rotated without bringing any of said intermediate compound gear-wheels into train, and hence any selected intermediate can be independently brought into a position just prior to intermeshing position in the orbit of rotation of the gear-support.

Q represents a support-shifting lever, preferably bell-crank in shape, pivoted to the supporting structure, having the toothed segment Q', engaging the teeth of the rack on stub-shaft J through the slotted bearing. Lever Q also has the locking-pawl P engaging the notches of disk M.

$e$ represents the outer end of lever Q, which has a pin engaging in the inclined slot $s'$ of the sliding rod G.

N represents a rocking lever fulcrumed on shaft C and having a toothed segment O, engaging gear-wheel 3 on stub-shaft J.

R represents an index opposite the handle of lever N for indicating different positions of rotation of the gear-support, and hence different positions of engagement of the several intermediate compound gear-wheels on the gear-support.

S represents a lever pivoted to the supporting structure and to the sliding bar G for actuating the same.

*Mode of operation.*—In the position shown in Fig. 1 gears 1 and 2 are in train with intermediate compound gear-wheel 4 5. The lever is in its vertical position, with pawl P engaging one of the notches of disk M, holding the support locked against rotation. Handle S is grasped and the gear-support shifted to the right, the movement releasing pawl P from disk M, the outer end of lever Q rising in inclined slot $s'$ and the lever F shifting clutch E to disengaged position. The gear-support can then be rotated through lever N, segment O, and gear-wheel 3 until the selected intermediate is rotated to a point in the orbit of rotation of the gear-support just prior to the position of intermesh with gear-wheels 1 and 2, were the intermediates in the planes of revolution of said gear-wheels. Then lever S is shifted in the other direction, the slot $s'$ permitting a certain degree of sliding to return position without fixing the clutch. When the members of the selected intermediate compound gear-wheel are partly in the plane of revolution of gears 1 and 2—that is, when the teeth of the driving, driven, and intermediate gear-wheels overlap slightly in vertical plane—lever N is rocked slightly, serving to roll the selected intermediate peripherally into mesh with the gears 1 and 2. The final movement of lever S is then completed, sliding the compound intermediates into full mesh with the driving and driven gear-wheels, locking pawl P into the suitably-presented locking-notch of disk M, and clutching the power-wheel to the driving-shaft, all simultaneously. This is a simple and convenient movement to execute, is free from danger, has a minimum amount of wear, and the fewest possible component parts.

In the modification shown in Fig. 3 the stub-shaft J is not slidable in its bearings; but it has the hand-wheel T for turning the support and the locking and indexing disks U. The gear-wheels are inclosed in the dust-proof casing V. In this arrangement a given intermediate may not be independently thrown into train; but as the members of the intermediates are always in the parallel planes of revolution of the driving and driven gear-wheels, respectively, they have to be successively intermeshed as the support is rotated—that is, say the four speeds represented by figures 20, 30, 40, and 50 are obtainable. To change from 20 to 40, the system must be first passed through the gradation of speed represented by the figure 30; but in some classes of work this restriction is a desideratum.

In the modification shown in Fig. 6, S represents the lever for shifting the shaft-shifting lever Q and the clutch-shifting lever F. In this modification 20 represents a bevel gear-wheel fixed to the shaft J, and a bevel-gear is used in place of the spur-gear 3. (Shown in Fig. 4.) It will be understood that the gear-wheel and notched disk are splined to the shaft, so as to turn therewith, but allow the longitudinal movement of the shaft J within said parts. In Fig. 6, 21 represents a bevel gear-wheel journaled in bracket-arm 23 and intermeshed with bevel-gear 20. 22 represents a shaft with a universal joint 24, fixed to the stud-shaft 25, on which a gear-wheel 21 is mounted. The outer end of this lever is pivoted to the end of the lever S. 26 27 represent the index mechanism on this lever, and 28 represents the operating-handle. This contrivance simplifies the operation inasmuch as the lever 28 may be rocked, shifting the clutch and the shaft through the lever S, sliding bar G, and levers Q and F, and the different gear-wheels may be brought into position by rotating shaft 22 until the point of the index notes the proper position of the selected gear-wheel.

The two members of each compound intermediate revolve as a single gear-wheel, but each intermediate is journaled so as to be revoluble independently of all the remaining intermediates. Therefore in operation only the selective intermediate revolves, and this intermediate through its two members is intermeshed directly with the driving and driven gear-wheel.

Many other instrumentalities, arrangements, and organizations could be devised for giving effect to the principles of my invention by a skilled mechanic familiar with the principles herein described and the particular preferred arrangement herein shown, and I do not desire to be limited to the details as disclosed except wherein specifically embodied in the claims.

Having described my invention, I claim—

1. In a variable-speed device, a driving and a driven shaft, driving and driven gear-wheels revoluble in parallel planes, respectively, a graduated series of independently-revoluble compound intermediates, a support therefor having a path of movement whereby one of the members of each compound intermediate is presented to the driving gear-wheel and the other member of each compound intermediate to the driven gear-wheel, and means for moving and locking said support, whereby a plurality of speed-values is obtainable and transmissible from a single driving to a single driven gear-wheel, substantially as described.

2. In a variable-speed device, a driving and a driven shaft, driving and driven gear-wheels revoluble in parallel planes respectively, a support, a plurality of graduated compound intermediates independently revoluble thereon, the members of which are placed in the parallel planes of the driving and the driven gear-wheels respectively, and means for moving said support whereby any one of said compound intermediates may be brought into train between the driving and driven gear-wheels, substantially as described.

3. In a variable-speed device, a driving and a driven gear-wheel of different diameter revoluble in parallel planes, a graduated series of independently-revoluble compound intermediate gear-wheels, the separate members of each being adapted to be placed in the parallel planes of said driving and driven gear-wheels respectively, said separate members having different diameters adapted to connect in train the driving and driven gear-wheels and means for shifting any selected one of said intermediates into train between the driving and the driven gear-wheels, substantially as described.

4. In a variable-speed device, a driving and a driven shaft, driving and driven gear-wheels therefor revoluble in parallel planes, a plurality of different-diameter intermediate compound gear-wheels independently revoluble each of which is adapted to bridge the space between the driving and driven gear-wheels, whereby different speeds may be transmitted from one shaft to the other, and means for bringing any selected one of said intermediates into position, substantially as described.

5. In a variable-speed device, a driving and a driven shaft, driving and driven gear-wheels thereon revoluble in parallel planes, a support, a graduated series of intermediate compound gear-wheels independently revoluble on said support with the separate members thereof respectively, in the parallel planes of the said driving and driven gear-wheels, said support being rotatably journaled so as to have a path of travel between said driving and driven gear-wheels, whereby any selected one of said intermediate compound gear-wheels may connect in train the said driving and driven gear-wheels, substantially as described.

6. In a variable-speed device, a driving and a driven shaft, a driving and driven gear-wheel thereon revoluble in different parallel planes, a support rotatably journaled eccentrically on one of said shafts, a graduated series of intermediate compound gear-wheels journaled on said support, the separate members of said intermediates being revoluble in the parallel planes of the driving and driven gear-wheels, whereby when said support is rotated said intermediates may be selectively intermeshed with said driving and driven gear-wheels, and means for rotating the support, substantially as described.

7. In a variable-speed device, a driving and a driven shaft, driving and driven gear-wheels thereon revoluble in parallel planes, a support rotatably journaled, a graduated series of intermediate compound gear-wheels independently revoluble on said support, the separate members of each being revoluble in the parallel planes of the driving and driven gear-wheels, said intermediates being located on the support in such line as to be intermeshed with the driving and driven gear-wheels respectively, when the support is rotated, and means for rotating and locking said support in selected positions, substantially as described.

8. In a variable-speed device, a driving and a driven shaft, a driving and a driven gear-wheel revolubly mounted on said shafts in parallel planes, a rotatable support, a graduated series of intermediate compound gear-wheels on said support the separate members whereof are revoluble in the parallel planes of said driving and driven gear-wheels respectively, said intermediates being placed on said support so as to be presented to the driving and driven gear-wheels when the support is rotated, means for rotating said support and means for shifting said support in a direction lengthwise of said shafts, whereby any selected intermediate may be independently connected in train with said driving and driven gear-wheels, substantially as described.

9. In a variable-speed device, a driving and a driven shaft, a driving and a driven gear-wheel of different diameter revoluble in parallel planes on said shafts, a support rotatably journaled eccentric to one of said shafts, a graduated series of intermediate compound gear-wheels the members of which are revoluble in the parallel planes of the driving and driven gear-wheels, said intermediates being arranged on said support so as to have a path of travel between the driving and driven gear-wheels when the support is rotated, means for rotating said support, means for locking support, and means for shifting said support lengthwise, whereby any selected intermediate compound gear-wheel may be independently intermeshed with said driving and driven gear-wheels, substantially as described.

10. In a variable-speed device, a driving and a driven shaft, a driving and a driven gear-wheel revoluble on said shaft in parallel planes, a power-wheel loosely mounted on the driving-shaft, a clutch for fixing said wheel to said shaft, a movable support, a graduated series of intermediate compound gear-wheels the members of which are revoluble in the parallel planes of said driving and driven gear-wheels, said intermediates being placed on said support so as to have a path of movement between said driving and driven gear-wheels whereby each of said intermediates is adapted to connect said gear-wheels in train, means for moving said support in the said parallel planes of said driving and driven gear-wheels, and means for moving said support and shifting said clutch simultaneously in opposite directions transversely to the planes of rotation of said gear-wheels, substantially as described.

11. In a variable-speed device, a driving and a driven shaft, a driving and a driven gear-wheel, a rotatable support, gear-wheels adapted to be intermeshed with said driving and driven gear-wheels, a hand-wheel for rotating said support, said support being movable longitudinally of its bearings, and means for shifting said support, substantially as described.

12. In a variable-speed device, a driving and a driven shaft, a driving and a driven gear-wheel, a rotatable support movable also transversely to its plane of rotation, gear-wheels on said support adapted to be intermeshed with said driving and driven gear-wheels, means for rotating said support, means for rocking said support in predetermined position of rotation, and means for shifting said support longitudinally, substantially as described.

13. In a variable-speed device, a driving and a driven shaft, a driving and a driven gear-wheel, a rotatable support movable also transversely to its plane of rotation, gear-wheels on said support adapted to be intermeshed with said driving and driven gear-wheels, means for rotating said support and locking it in predetermined positions of rotation, a power-wheel and a clutch on the driving-shaft, and means for shifting said clutch and said support simultaneously, substantially as described.

14. In a variable-speed device, a driving and a driven shaft, driving and driven gear-wheels thereon revoluble in parallel planes, a support consisting of parallel rotatable disks one of which is journaled eccentrically on one of said shafts, the other disk being provided with a stud-shaft journaled concentrically to the journal of the opposing disk, a graduated series of intermediate compound gear-wheels journaled between said supporting-disks, the members of each compound intermediate being revoluble in the parallel planes of the driving and driven gear-wheels respectively, and means for rotating said supports whereby said compound intermediates may be successively intermeshed with said driving and driven gear-wheels, substantially as described.

15. In a variable-speed device, a driving and a driven shaft, a driving and a driven gear-wheel revoluble in parallel planes thereon, a support consisting of opposing disks one of which is journaled eccentrically on one of said shafts, the other being provided with a stud-shaft journaled concentrically with the opposing disk, a graduated series of intermediate compound gear-wheels journaled between said disks, with the separate members in the planes of the driving and driven gear-wheels respectively, the said intermediates being disposed on said support so as to have a path of travel between the driving and driven gear-wheels when the support is rotated, the said support being movable transversely to its plane of rotation, means for shifting said support and means for rotating and locking said support, substantially as described.

16. In a variable-speed device, a driving and a driven shaft, a driving and a driven gear-wheel thereon revoluble in parallel planes, a stud-shaft journaled eccentrically relative to one of said shafts, a support fixed to said stud-shaft, a graduated series of intermediate compound gear-wheels on said support the members of which are in the planes of the driving and driven gear-wheels respectively, and means for rotating said support; whereby the separate members of each compound intermediate may be intermeshed with the driving and driven gear-wheels respectively, substantially as described.

17. In a variable-speed device, a driving and a driven shaft, a driving and a driven gear-wheel revoluble in parallel planes thereon, a stud-shaft provided with a rack, journaled eccentrically relative to one of said shafts, a notched disk on said shaft, a support on said shaft, said stud-shaft being movable longitudinally in its bearings, a graduated series of intermediate compound gear-wheels disposed on said support, the members of which intermediates are adapted to be intermeshed with the driving and driven gear-wheels respectively, when the support is rotated, means for rotating said stud-shaft, a lever having a segment engaging the rack of the stud-shaft, and a pawl engaging the notches of the disk, and means for shifting said lever, substantially as described.

18. In a variable-speed device, a driving and a driven shaft, a driving and a driven gear-wheel revoluble in parallel planes thereon, a power-wheel loose on the driving-shaft, a clutch on said driving-shaft adapted to fix said power-wheel to said shaft, a shifting-lever for the clutch, a stud-shaft journaled eccentrically to one of said shafts, a rack, a locking-disk and a support all on said stud-shaft, compound intermediates on said support, each adapted to connect said driving and driven gear-wheels in train when the support is rotated, means for rotating said stud-shaft, a lever having a segment engaging the rack and a pawl engaging the locking-disk on said stud-shaft, connections between said clutch-shifting and stud-shaft-shifting levers, and means for shifting said levers, whereby any selected compound intermediate may be thrown into train while the power is off, substantially as described.

19. In a variable-speed device, a driving and a driven shaft, a driving and a driven gear-wheel thereon, a stud-shaft, a support thereon, gear-wheels on said support adapted to be selectively intermeshed with said driving and driven gear-wheels to give a variety of speeds, a gear-wheel fixed to said stud-shaft, a lever having a segment engaging said gear-wheel on the stud-shaft, and an index opposite said lever whereby said support may be rotated to predetermined positions, substantially as described.

20. In a variable-speed device, a driving and a driven shaft, a driving and a driven gear-wheel thereon, a stud-shaft, a support thereon, gear-wheels on said support adapted to be selectively intermeshed with said driving and driven gear-wheels to give a variety of speeds, a gear-wheel and a notched locking-disk on said stud-shaft, a lever having a segment the teeth of which engage the teeth of the gear-wheel on the stud-shaft, an index opposite said lever, and means for locking said notched disk, substantially as described.

21. In a variable-speed device, the driving and driven shafts, their gear-wheels, the rotatable support, its compound intermediates adapted to selectively connect in train said shafts, said support being rotatable and movable transversely to its plane of rotation, a power-wheel loose on the driving-shaft, a clutch for fixing said power-wheel to said driving-shaft, a rack for shifting said support, a notched disk for locking said support in different positions of adjustment, a lever for shifting said clutch, a lever having a segment engaging said rack and a pawl engaging said notched disk, a connecting-bar having slotted engagement with said levers, means for shifting said levers, and means for rotating said support, substantially as described.

22. In a variable-speed device, the driving and driven shafts, driving and driven gear-wheels thereon revoluble in parallel planes, a rotatable support, a series of independently-revoluble intermediate compound gear-wheels on said support the members of each of which are revoluble in the planes of the driving and driven gear-wheels, the center of said support being so disposed that the said intermediates have an orbit of revolution between said shafts and around one of them, and means for rotating said support whereby the driving and driven gear-wheels may be directly intermeshed respectively with the two members of any selected one of said compound intermediates, substantially as described.

23. In a variable-speed device, the driving and driven shafts, driving and driven gear-wheels thereon revoluble in parallel planes, the support eccentrically journaled on one of said shafts, a series of intermediate compound gear-wheels on said support the members of which are revoluble in the planes of said driving and driven gear-wheels, the eccentricity of the support, and the disposition of the intermediates thereon being such that when the support is rotated the intermediates have an orbit of rotation between said shafts and around one of them, whereby said driving and driven gear-wheels may be connected in train through any selected one of said intermediates, substantially as described.

24. In a variable-speed device, the driving and driven shafts, the driving and driven gear-wheels thereon revoluble in parallel planes, a rotatable support, a series of independently-rotatable intermediate compound gear-wheels thereon, the members of which are revoluble in the planes of the driving and driven gear-wheels, the center of said support being so disposed that said intermediates have an orbit of rotation between said shafts and around one of said shafts, and means for rotating said support whereby said shafts may be connected in train through any selected one of said intermediates, substantially as described.

25. In a variable-speed device, the driving and the driven shafts, a driving and driven gear-wheel thereon revoluble in parallel planes, a support eccentrically journaled, a series of intermediate compound gear-wheels on said support the members of which are revoluble in the planes of the driving and driven gear-wheels, the eccentricity of said support and the disposition of the intermediates thereon being such that when said support is rotated the intermediates have an orbit of rotation in which the peripheries of each are successively intermeshed with the driving and driven gear-wheels at a given point and passed out of mesh at every other point in said orbit of revolution, and means for rotating said support, substantially as described.

26. In a variable-speed device a driving and a driven shaft, a driving and a driven gear-wheel one of which wheels is on one end of said shafts, said gear-wheels being revoluble in parallel planes, a rotatable support placed opposite the end of said shaft, a gear-wheel thereon, a graduated series of intermediate compound gear-wheels on said support the members of which are revoluble in the planes of said driving and driven gear-wheels, the center of said support and the disposition of said intermediates being such that when said support is rotated the center of said intermediates have an orbit of rotation in which each intermediate is successively intermeshed with said driving and driven gear-wheels at a given point and out of mesh at every other point in the said orbit of rotation, and means for rotating said support, substantially as described.

27. In a variable-speed device, a driving and a driven shaft, a driving and a driven gear-wheel on said shafts revoluble in parallel planes, one of said gear-wheels being placed on an end of one of said shafts terminating within the variable-speed mechanism, a support rotatably placed opposite the end of said last-mentioned shaft, a graduated series of intermediate compound gear-wheels on said support the members of which are revoluble in the planes of revolution of said driving and driven gear-wheels, a journal for said support having bearings in the said plane of revolution of said gear-wheels, said support being slidable on its bearings in directions transverse to its plane of rotation, the center of said support being so disposed relative to said shafts, and the centers of said intermediates being so disposed relative to the center of said support, that when the support is rotated the intermediates have an orbit of rotation between said shafts and around the end of one of them in only one point of which the intermediates may be brought into mesh with the driving and driven gear-wheels, means for rotating said support, and means for shifting said support laterally whereby a selected intermediate may be thrown into mesh independently of the others, substantially as described.

28. In a variable-speed device, a driving and a driven shaft, the driving and driven gear-wheels revoluble in parallel planes thereof, the power-wheel loose on the driving-shaft, a clutch on the driving-shaft adapted to fix said power-wheel to said shaft, the driving-shaft being slidable longitudinally in its bearing, means for selectively intermeshing a graduated series of compound intermediate gear-wheels between said driving and driven gear-wheels, said means consisting of a rotatable support, means for rotating and locking said support and a combined lever and shaft adapted to rotate said support and to shift said clutch and driving-shaft, substantially as described.

In testimony whereof I have hereunto set my hand.

ANTON MILL.

Witnesses:
OLIVER B. KAISER,
IDA J. LUCAS.